(12) United States Patent
Young

(10) Patent No.: US 6,417,450 B1
(45) Date of Patent: Jul. 9, 2002

(54) COVER ASSEMBLY FOR IN-FLOOR DEVICES

(75) Inventor: Joe A. Young, Reedsville, OH (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 09/652,094

(22) Filed: Aug. 31, 2000

(51) Int. Cl.⁷ .................................................. H02G 3/14
(52) U.S. Cl. ........................ 174/66; 220/241; 220/242; 174/66
(58) Field of Search .......................... 174/5 R, 66, 67, 174/53; 220/241, 242; D13/156, 154, 177; D8/350, 352, 353; 439/142, 148, 107

(56) References Cited

U.S. PATENT DOCUMENTS

| | | | |
|---|---|---|---|
| 2,985,334 A | * 5/1961 | Slater | 220/242 |
| 4,289,921 A | * 9/1981 | Gartner et al. | 174/48 |
| 4,443,654 A | 4/1984 | Flachbarth et al. | |
| 4,864,078 A | 9/1989 | Bowman | |
| 4,915,638 A | * 4/1990 | Domian | 439/142 |
| 5,064,969 A | * 11/1991 | Bloom | 174/67 |
| 5,160,808 A | 11/1992 | Hadfield | |
| D432,093 S | 10/2000 | Stout | |

FOREIGN PATENT DOCUMENTS

JP 405276627 * 10/1993 .................. 174/53

* cited by examiner

Primary Examiner—Dean A. Reichard
Assistant Examiner—Dhiru R Patel
(74) Attorney, Agent, or Firm—McAndrews, Held & Malloy, Ltd.

(57) ABSTRACT

An access cover for an in-floor fitting of the type supporting a plurality of power and/or communication distribution devices includes a cover plate connectable to the fitting. The cover plate includes at least one access door and preferably separate access doors for each distribution device in the fitting. The access doors are pivotally connected to the cover plate for movement between a closed positions at which the doors overlies the associated distribution devices to prevent access thereto and an open positions at which the associated distribution devices are exposed to provide access thereto. A retainer plate is interposed between the cover plate and the fitting. The retainer plate includes retaining hooks associated with each of the access doors. Each of the retainer hooks is positioned to engage with an associated door to releasably maintain the door at its closed position. The retaining hooks are normally biased to first positions at which they engage with an the associated doors and are movable to second positions to permit the doors to be moved from their closed positions. The retainer plate further presents a rib that is positioned to engage with the hinge side of the doors to releasably maintain the doors at their open position.

7 Claims, 5 Drawing Sheets

COVER ASSEMBLY FOR IN-FLOOR DEVICES

CROSS-REFERENCE TO RELATED APPLICATIONS

Not applicable.

STATEMENT REGARDING FEDERALLY SPONSORED RESEARCH OR DEVELOPMENT

Not Applicable

BACKGROUND OF THE INVENTION

This invention relates to a cover for in-floor power and/or communication devices, and, more particularly to a cover that has at least one access door that can be closed when the in-floor devices are not in use.

Modern office buildings require electric power, communication, and computer data services in various combinations at a large number of locations. A variety of systems exist for meeting these needs. One type of system uses a network of ducts or raceways mounted in concrete floors. Access to the underfloor service raceways is obtained through presets that are mounted on the raceways at regular intervals, usually 24 inches on center, before the concrete floor is poured. The preset defines a hollow interior compartment that is interconnected with the interior of the duct to provide access to the services that are carried in the duct. The preset includes a removable mud cap that is generally parallel to the surface of the floor and is positioned slightly below the surface of the concrete floor. The mud cap serves to prevent concrete from entering the interior compartment of the preset when the floor is poured. After the concrete floor has hardened, the concrete above the mud cap is broken away and the mud cap is removed to provide access to the interior of the preset. An activation assembly that supports data and/or power receptacles is then installed in the preset. An activation assembly may then be installed in the afterset to provide power and/or data receptacles.

Access to the raceways may also be provided through afterset housings that are attached to the raceway after the concrete floor has been poured and is set. Aftersets are installed by cutting a hole in the concrete above the raceway and then securing the afterset to an opening that is cut in the raceway after the concrete has been removed to provide access to the raceway. Like a preset, the afterset defines hollow interior compartment that is interconnected with the interior of the raceway to provide access to the services that are carried in the raceway.

Another type of system uses poke-through fittings that are installed in an opening in a floor, such as a concrete slab or steel deck, in a building to enable the activation of power and data signal services at the poke-through fitting's location. Source power and signal cables, loosely positioned in a plenum, which is between the ceiling of the floor below and the floor above (that is, the floor in which the opening is in), may be pulled from the plenum and connected with or passed through the poke-through fitting for activation of services for and on the floor above.

These systems typically employ a cover plate overlies the in-floor fitting to restrict access thereto and to protect the power and data receptacles when they are not being used. An example of known cover plate is shown in FIG. 1. This device consists of a metal plate and a plurality of doors that are positioned to overlie the power/data distribution devices (receptacles) carried by the in-floor fitting. In the illustrated embodiment, the cover plate includes two doors that are configured to overlie the electrical outlets of a conventional duplex receptacle. As will be appreciated, the shape and number of doors is dictated by the fitting to which the cover plate is to be connected. For example, poke-through fittings are typically round, so in such instances the cover plate would typically be round. The doors pivot open to provide access to the outlets of the underlying receptacle. Fasteners extend through the cover plate and thread into the fitting to secure the cover plate thereto. Locking screws are provided for locking the access doors in their closed position. Prior designs which employ the locking screws require numerous parts to produce. Moreover, the locking screws have a tendency to come apart and get lost during use.

BRIEF SUMMARY OF THE INVENTION

Hence, an object of the invention is to provide a cover assembly for an in-floor fitting which is simple and economical to manufacture.

Another object of the present invention is to provide a cover assembly for an in-floor fitting that has separate doors for each in-floor device.

A further object of the present invention is to provide a cover that can be used with a wide variety of in-floor fittings, such as preset fittings, afterset fittings, poke-through fittings and in-floor outlet boxes.

Another object of the present invention is to provide a cover assembly which includes means for maintaining the access doors at their closed position. A further object of the present invention is to provide a cover assembly which includes means for maintaining the access doors.

One or more of the above objects and advantages are provided by an access cover for an in-floor fitting of the type supporting a plurality of data and/or communication distribution devices. The access cover includes a cover plate connectable to the fitting and at least one access door pivotally connected to the cover plate for movement between a closed position at which the door overlies the distribution devices to prevent access thereto and an open position at which the associated distribution device is exposed to provide access thereto. First and second means are provided for retaining the access door at its open and closed positions, respectively. The first means may be in the form of a retaining hook positioned to engage with the cover when the cover is at its closed position. The retaining hook is normally biased to a first position at which it engages with the access door and is movable to a second position to permit the access door to be moved from its closed position. The second means may be in the form of a rib positioned to engage with the door to releasably maintain the door at its open position. The rib and retaining hooks may be carried by a retainer plate which is disposed between the cover plate and the in-floor fitting.

DETAILED DESCRIPTION OF THE PREFERRED EMBODIMENT OF THE INVENTION

Figure 1:
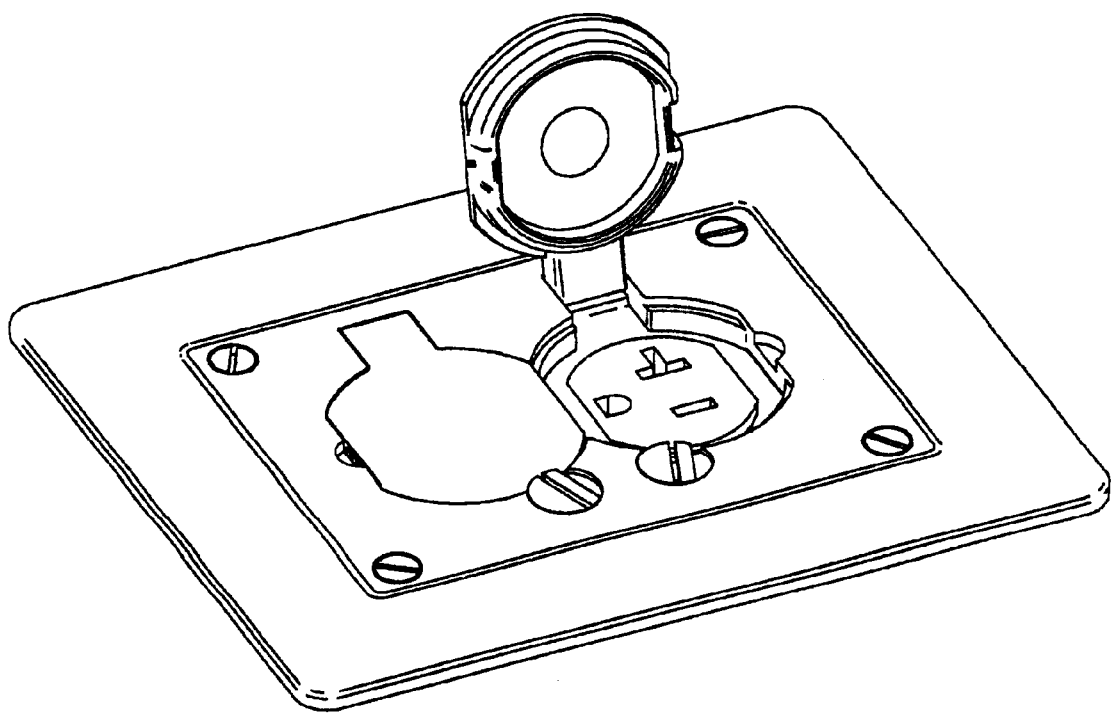
FIG. 1 is a perspective view of a prior art access cover.
Figure 2:
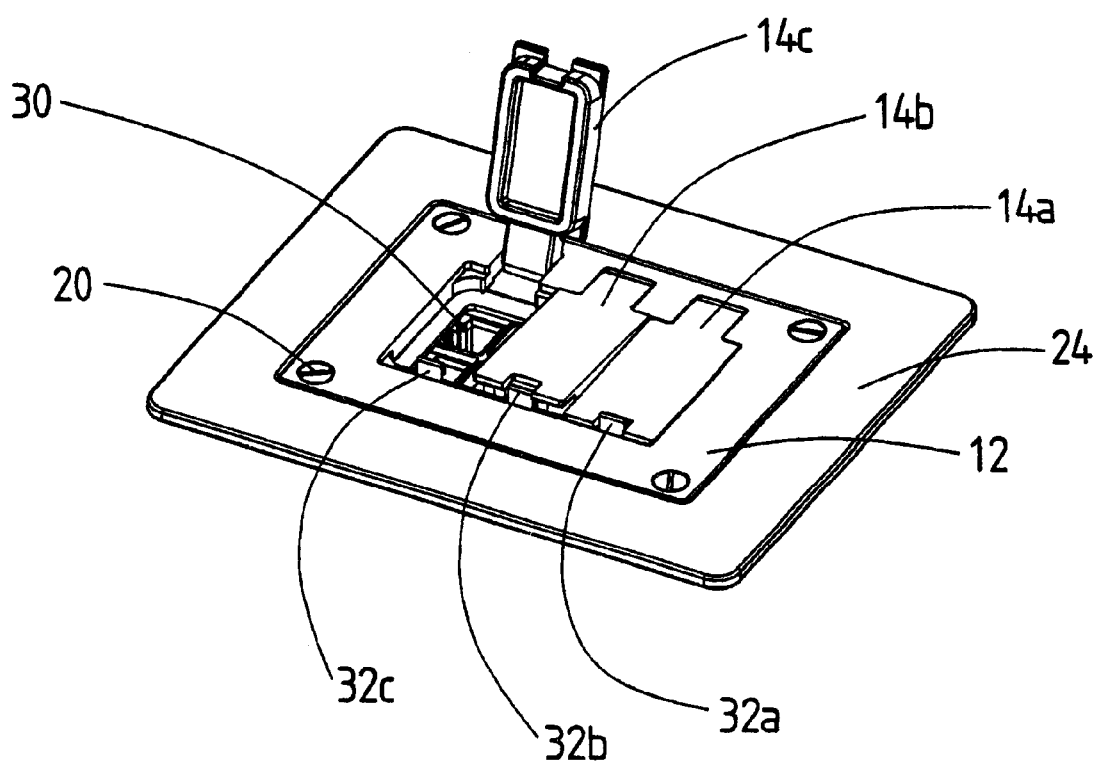
FIG. 2 is a front perspective view of an access cover according to the present invention.
Figure 3:
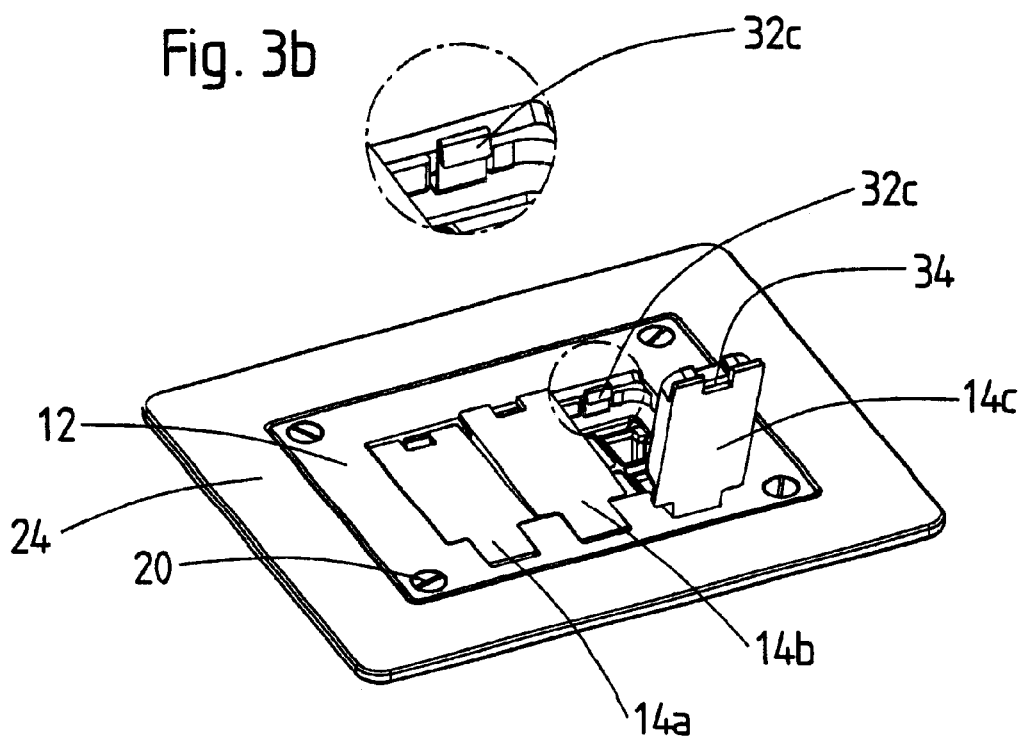
FIG. 3A is a rear perspective view of the access cover of FIG. 2 installed on an in-floor fitting.
FIG. 3B is an enlarged view of the portion of FIG. 3A encircled by the broken line.

While the invention will be described in connection with one or more embodiments, it will be understood that the invention is not limited to those embodiments. On the contrary, the invention includes all alternatives, modifications, and equivalents as may be included within the spirit and scope of the applicant's invention.

Referring to FIGS. 3–6, a cover assembly 10 in accordance with a preferred embodiment of the present invention includes a cover plate 12, a plurality of access doors 14a–c movably connected to the cover plate 12, an access door retainer plate 16 which underlies the cover plate, a gasket 18 which underlies the door retainer plate 16, and a plurality of cover hold down screws 20 which secure the cover plate 12 to the in-floor fitting 22. Preferably, the cover plate 12 is formed of a metal such as brass or aluminum, the retainer plate is made of a metal such as spring steel, and the gasket is formed of a suitable material such as foam rubber. It will be appreciated, however, that other materials could be used without departing from the scope of applicant's invention. For example, the cover plate 12 and retainer plate could be formed of plastic.

Figure 4:
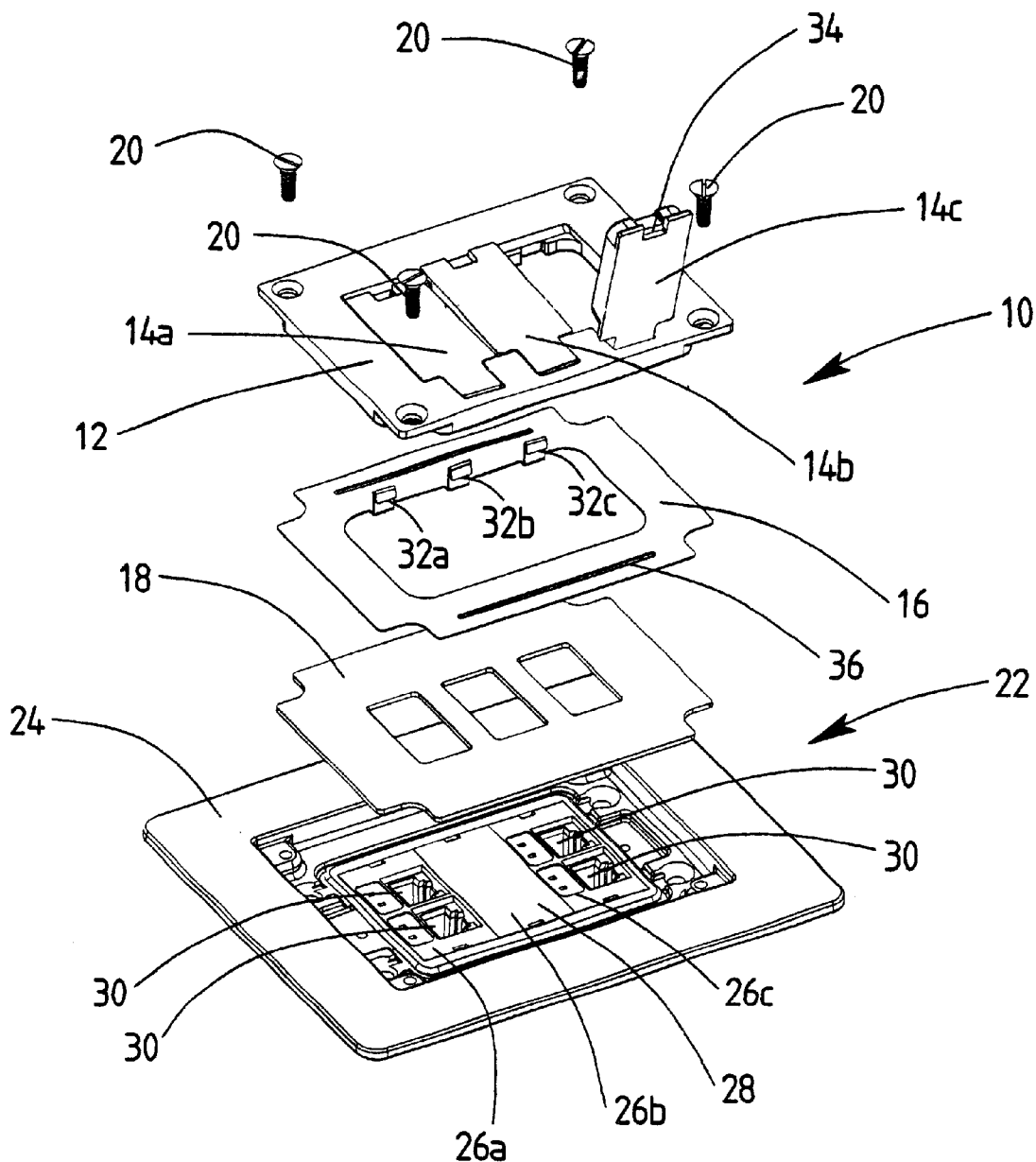
FIG. 4 is an exploded view of the access cover of FIG. 2.
Figures 5A, 5B:
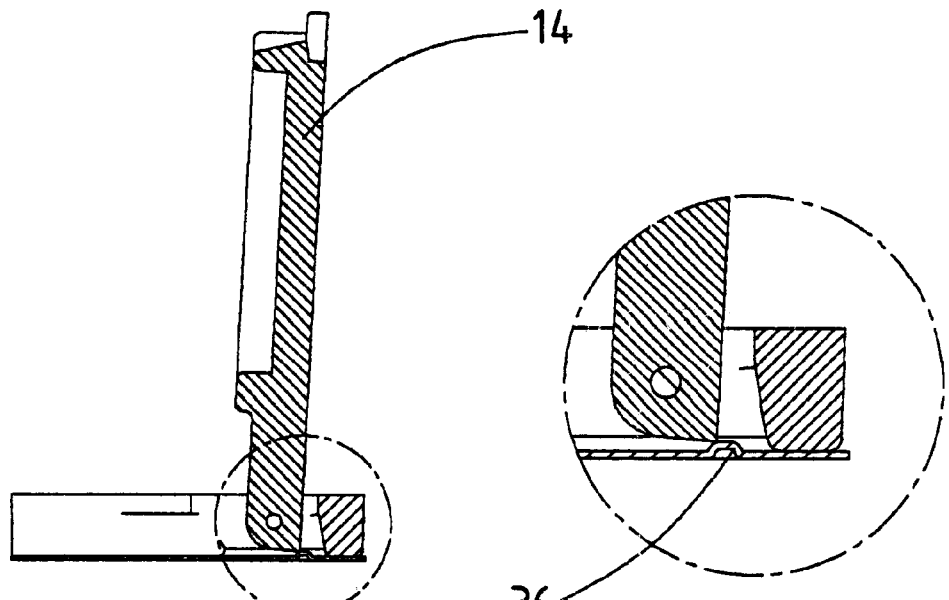
FIG. 5A is a partial cross sectional view showing the interface between an access door and a retainer rib, in accordance with certain aspects of the present invention.
FIG. 5B is an enlarged view of the portion of FIG. 5A encircled by the broken line.
Figures 6A, 6B:
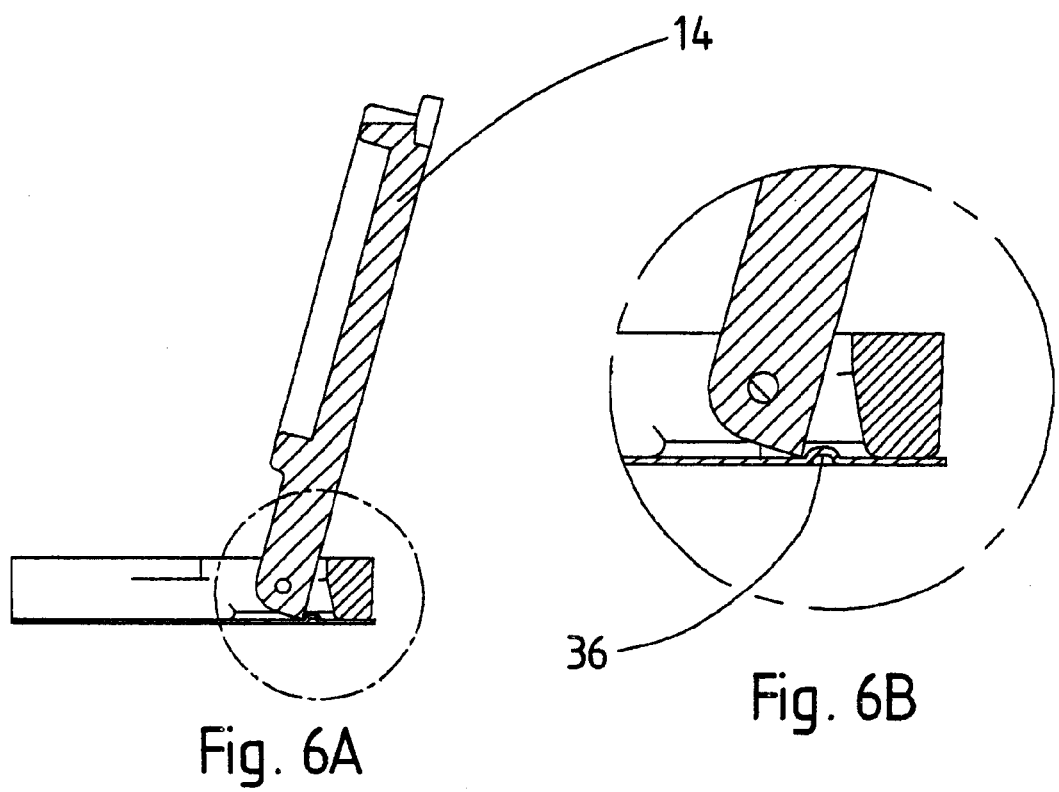
FIG. 6A is a partial cross sectional view showing the interface between an access door and a retainer rib, where the door is in its fully open position.
FIG. 6B is an enlarged view of the portion of FIG. 6A encircled by the broken line.

In the illustrated embodiment, the cover assembly 10 is configured to be installed onto a trim flange 24 or ring of the in-floor fitting 22. In the illustrated embodiment, the cover assembly 10 is configured for use with an in-floor fitting which has three data ports 26a, 26b, 26c. (See FIG. 4). It will be appreciated, however, that the present invention can readily be configured for use with a variety of in-floor fittings and is not limited to the particular embodiment shown and described herein. For example, the cover plate could be configured for use with a fitting that houses a duplex power receptacle, or a combination of data and power devices. In FIG. 4, two of the data ports 26a, 26c have been activated and the third data port 26b is covered by a removable plate 28. Each of the activated data ports 26a, 26b houses a pair of data jacks 30, such as category 5 jacks, that present terminals for connection to above floor devices. The lower ends (not shown) of the jacks 30 are connected within the fitting to source cables that are routed within an in-floor distribution device, not shown.

In the illustrated embodiment, the cover plate 12 has three access doors 14a, 14b, 14c which overly the data ports, 26a, 26b, 26c, respectively. The access doors 14a–c are pivotally connected to the cover plate for movement between a first or closed position at which the door overlies the associated data port to prevent access thereto, and a second position at which the associated data port is exposed to provide access thereto. Means are provided for retaining the doors 14a–14c at their closed position. More particularly, retainer hooks 32a–c extend upwardly from the retainer plate 16 and engage with reciprocal landings 34 formed on the access doors 14a–c, when the doors are in their closed position. The hooks 32a–c can be moved outwardly, e.g. with a screwdriver, to disengage them from an associated door 14a–c to allow the door to be moved to its open position.

Means are also provided for retaining the covers at their open position. This means is in the form of a retaining rib 36 which protrudes upwardly on the hinge side of the retainer plate 16. Although a single rib is shown, it will be appreciated that separate ribs could be formed for each of the doors 14. The rib is positioned to engage with the back edge of the door as it is pivoted towards its open position. (See FIGS. 5A and 5B). As the door continues to pivot towards its open position, its back edge moves past the rib. (See FIGS. 6A and 6B). At this position, the resistance of the rib against the door prevents the door from being inadvertently closed, e.g. against any cables exiting from the fitting.

What is claimed is:

1. An access cover for an in-floor fitting of the type supporting at least one communication or power distribution device, comprising:

a cover plate connectable to the in-floor fitting;

at least one access door pivotally connected to the cover plate for movement between a closed position at which the door overlies the at least one distribution device to prevent access thereto and an open position at which the distribution device is exposed to provide access thereto;

a retaining hook positioned to engage with the access door to when the door is at its closed position so as to retain the access door at its closed position; and a rib positioned to engage with the access door to releasably maintain the door at its open position.

2. The access cover as set forth in claim 1, wherein the retaining hook is normally biased to a first position at which it engages with the access door and is movable to a second position to permit the access door to be moved from its closed position.

3. An access cover for an in-floor fitting which houses a plurality of distribution devices, comprising:

a cover plate connectable to the in-floor fitting;

a plurality of access doors connected to the cover plate, each access door being movable between a closed position at which the door overlies one of the distribution devices to prevent access thereto and an open position to provide access to distribution device;

a retainer plate disposed between the cover plate and the in-floor fitting, the retainer plate including a plurality of retainer hooks, each retainer hook being positioned to engage with a different one of the access doors when the access door is at its closed position so as to maintain the access door in its closed position.

4. The access cover as set forth in claim 3, wherein each of the retainer hooks is normally biased to a first position at which it engages with one of the access doors and is movable to a second position to permit the access door to be moved from its closed position.

5. The access cover as set forth in claim 3, wherein retainer plate further includes at least one rib positioned to engage with the access doors to releasably maintain the access doors at their open position.

6. The access cover of claim 3, wherein the cover plate is formed of metal.

7. The access cover of claim 3, wherein the retainer plate is formed of metal.

* * * * *